United States Patent [19]

Angehrn

[11] Patent Number: 5,164,548
[45] Date of Patent: Nov. 17, 1992

[54] METHOD AND APPARATUS FOR ULTRASONIC SCANNING OF A BOREHOLE HAVING IMPROVED SENSOR ARRAY AND TIMING CIRCUIT

[75] Inventor: Jorg A. Angehrn, Brea, Calif.

[73] Assignee: Chevron Research and Technology Company, San Francisco, Calif.

[21] Appl. No.: 700,030

[22] Filed: May 14, 1991

Related U.S. Application Data

[63] Continuation-in-part of Ser. No. 153,629, Feb. 8, 1988, abandoned.

[51] Int. Cl.$^5$ ............................................. G01V 1/40
[52] U.S. Cl. ....................................... 181/103; 367/25; 367/26; 367/69; 181/104
[58] Field of Search ............... 367/25, 26, 28, 35, 367/69, 911, 86; 181/104, 105, 112, 103; 340/858

[56] References Cited

U.S. PATENT DOCUMENTS

| | | | |
|---|---|---|---|
| 4,446,540 | 5/1984 | Zimmer | 367/26 |
| 4,646,565 | 3/1987 | Siegfried | 73/152 |
| 4,867,264 | 9/1989 | Siegfried | 181/105 |

*Primary Examiner*—Ian J. Lobo
*Attorney, Agent, or Firm*—W. K. Turner; David J. Power

[57] ABSTRACT

A borehole televiewer is modified to provide an improved signal-to-noise ratio by utilizing a series of receivers arranged in a planar array configuration with respect to a centrally located transmitting transducer. The array covers at least a 90° quadrant of the tool, extending approximately 45° on either side of the transducer to allow the receivers to capture all primarily reflected signals, both the specular component as well as the vertical and horizontal components of the scattered reflections. The signal-to-noise ratio is further enhanced by the use of a noise-dependent timing means, as well as signal conditioning and detection circuits for each of the receivers in the array.

9 Claims, 12 Drawing Sheets

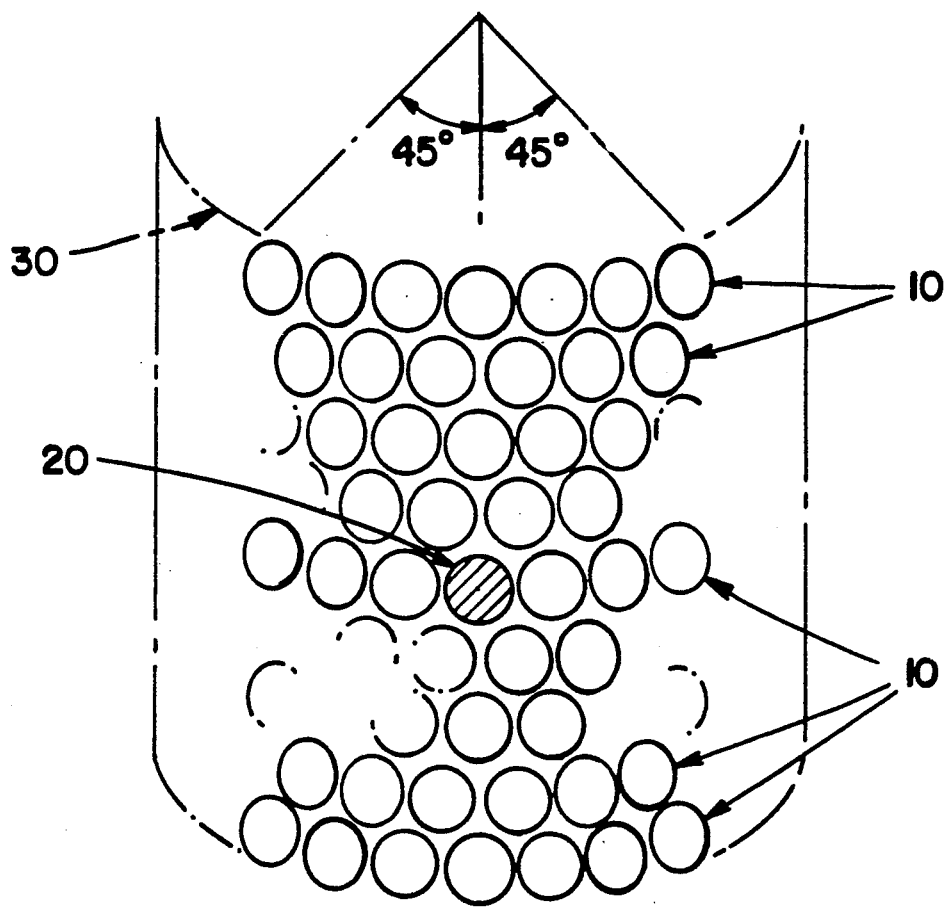
FIG_1a
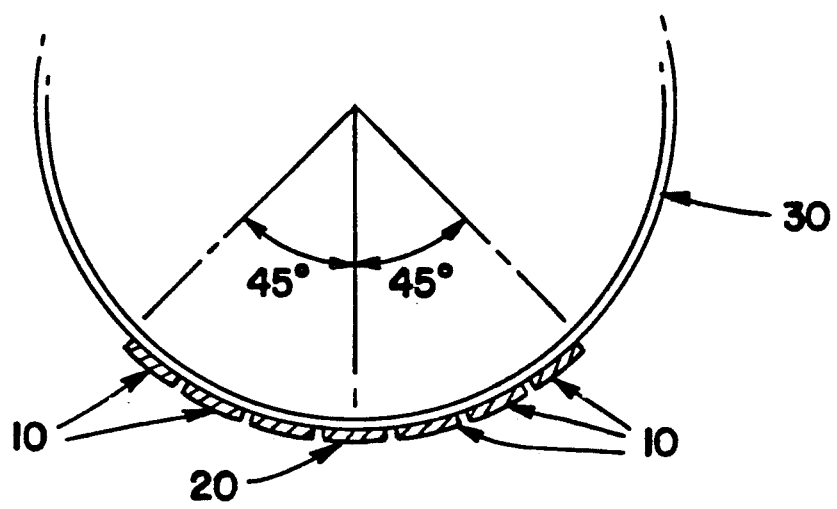
FIG_1b

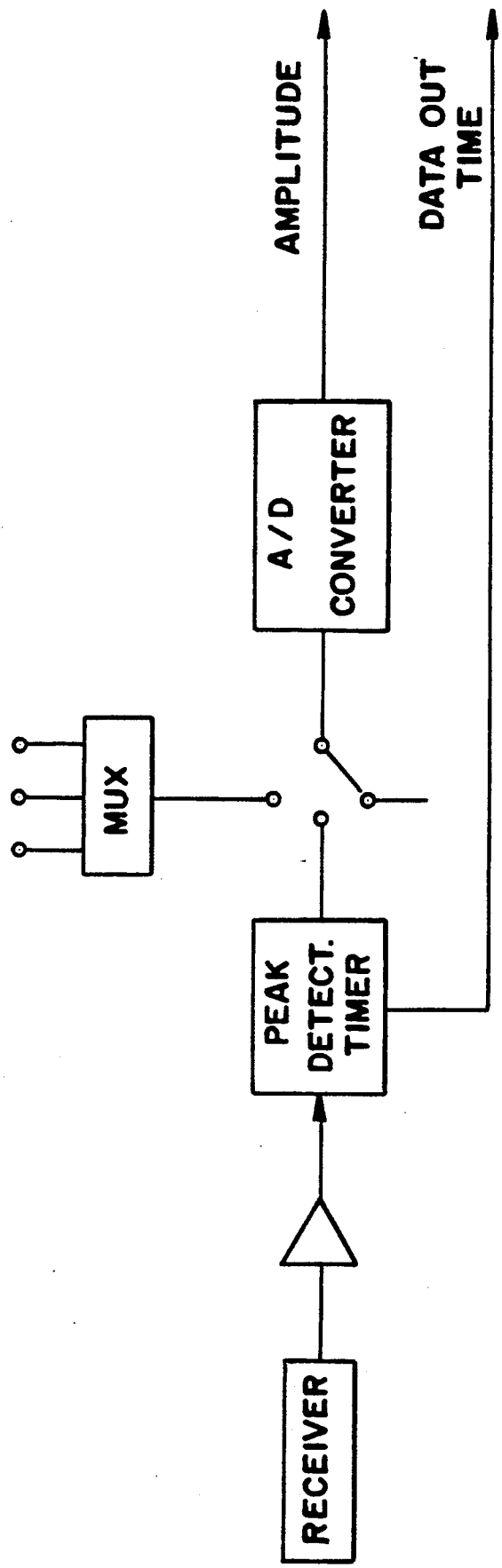
FIG_2

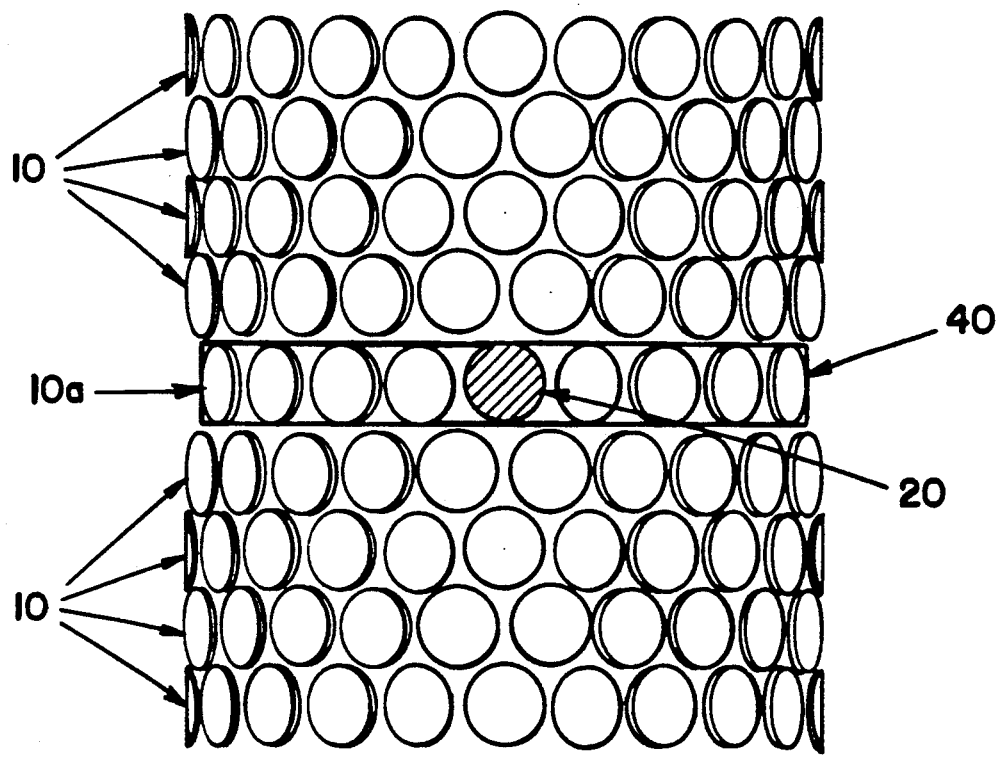
FIG_3
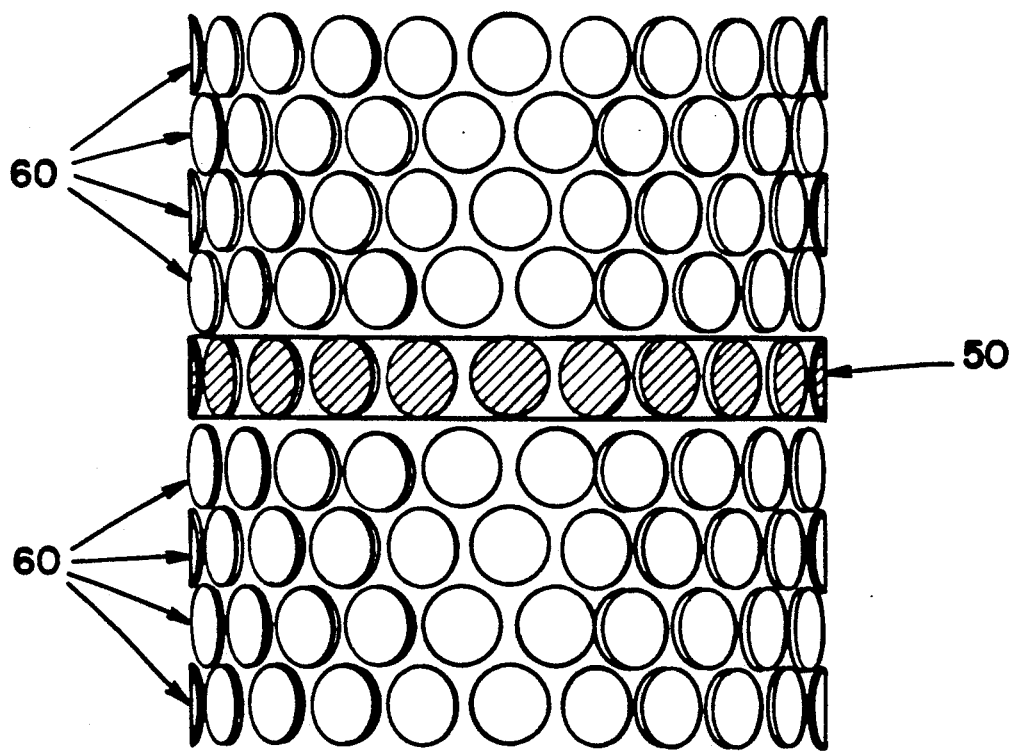
FIG_4

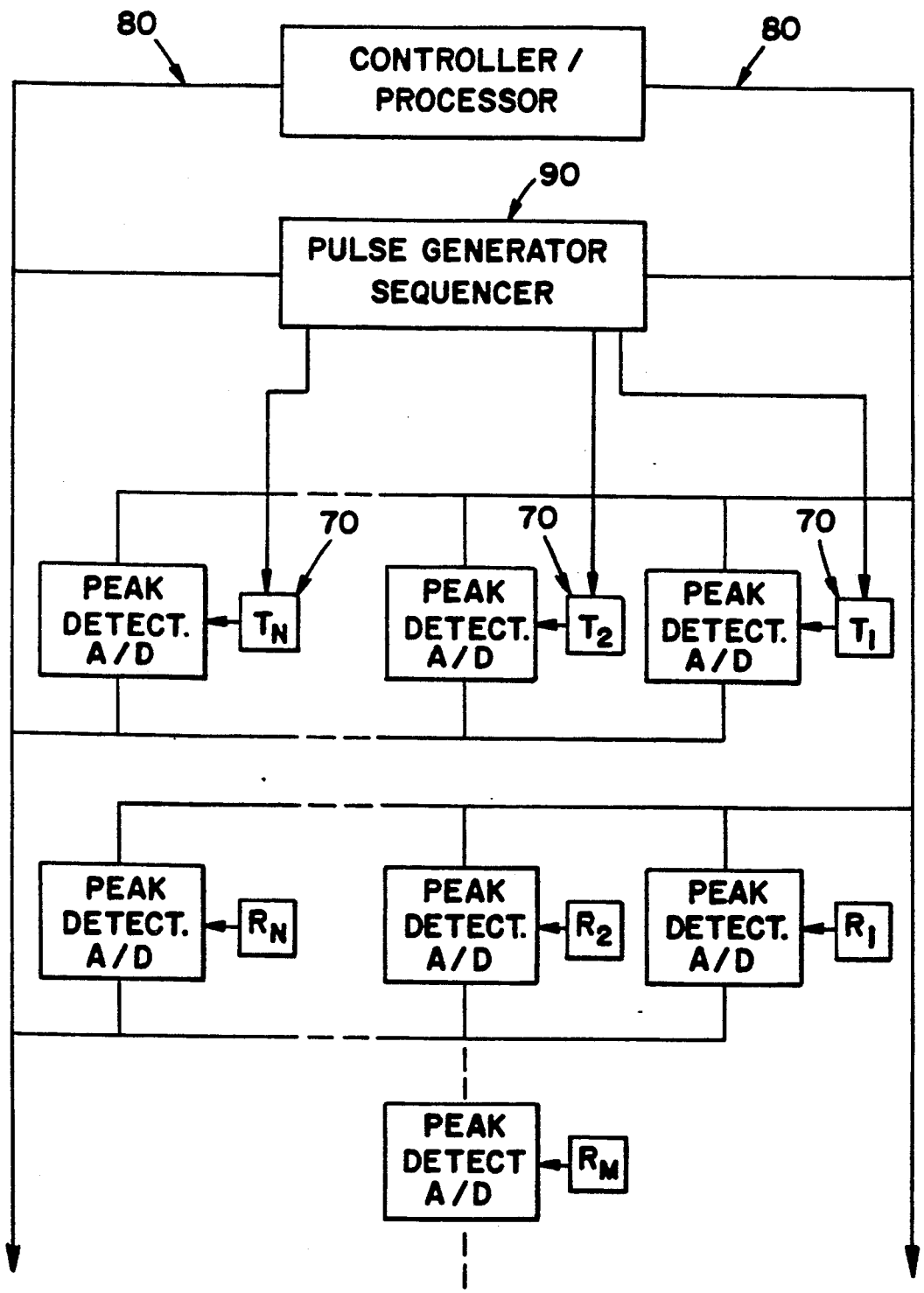
FIG_5

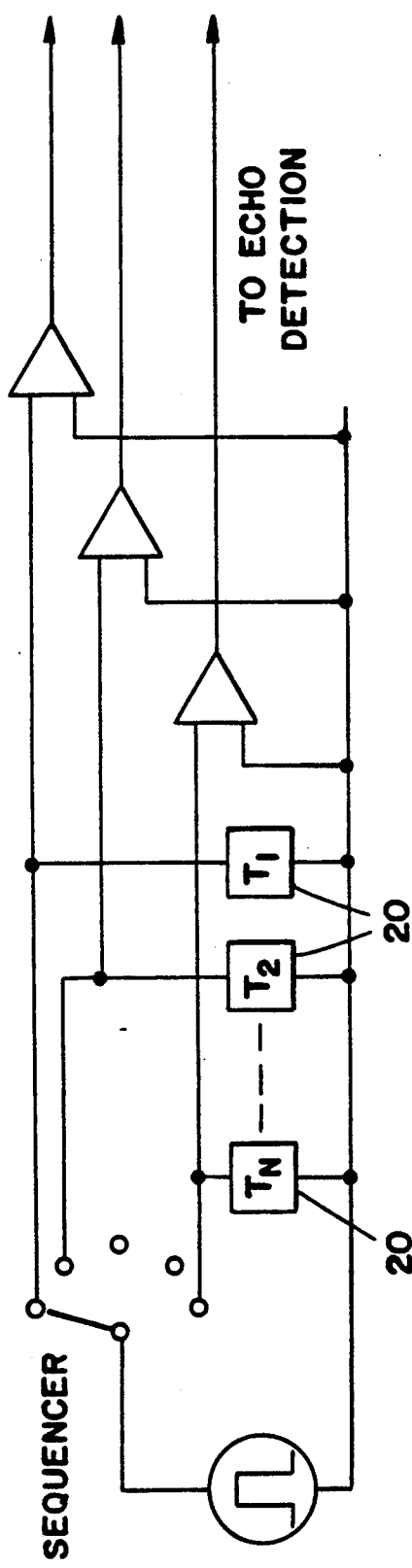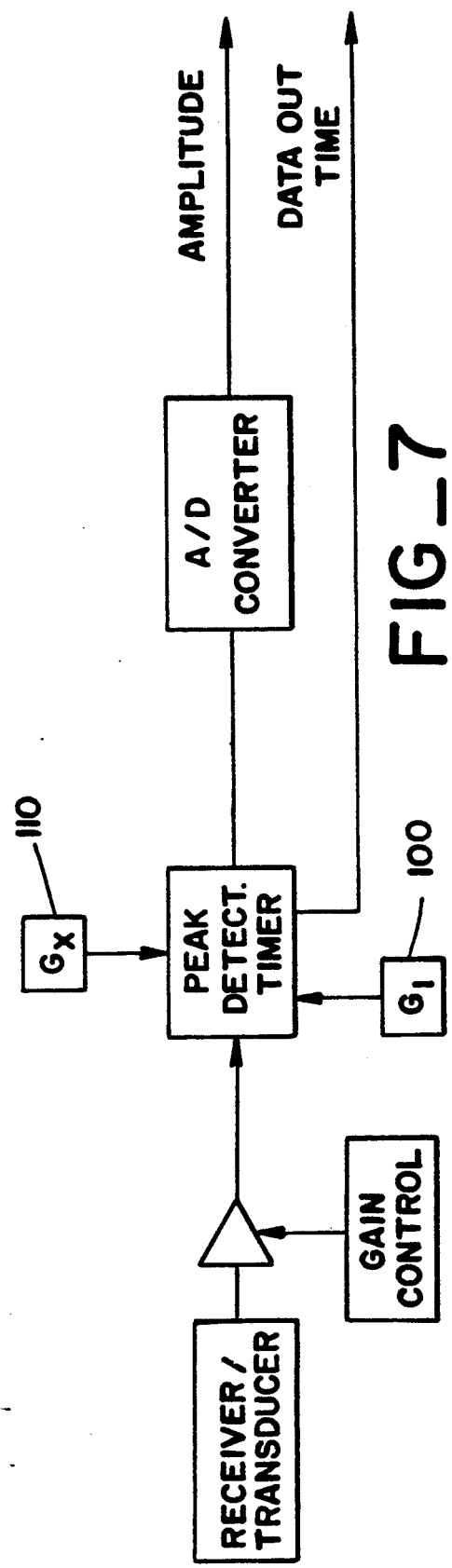

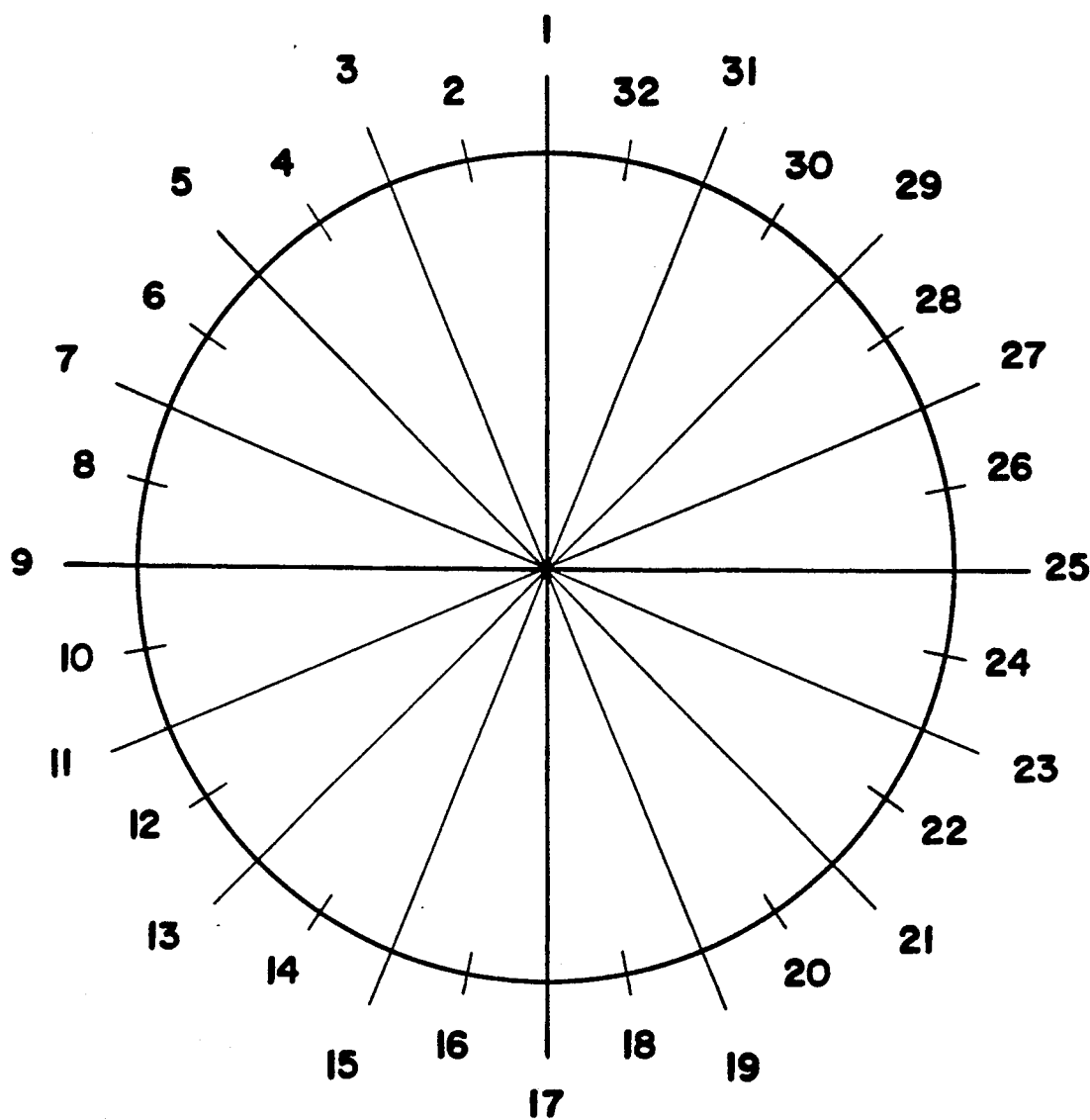
PLAN VIEW OF BOREHOLE TELEVIEWER HAVING
32 TRANSDUCERS IN A CENTRAL RING
( NUMBERS IDENTIFY TRANSDUCER NUMBER )
FIG_8

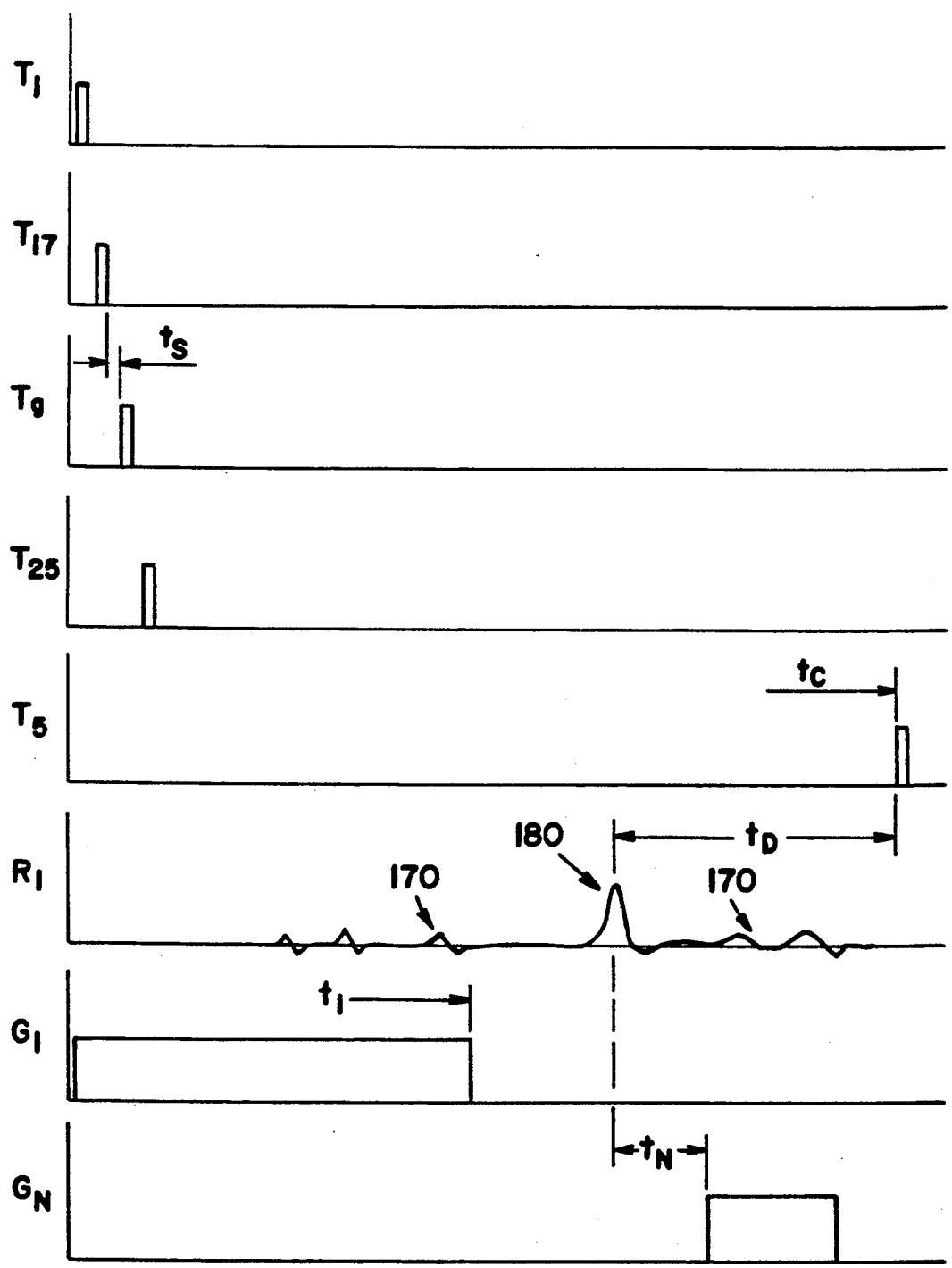
FIG_9

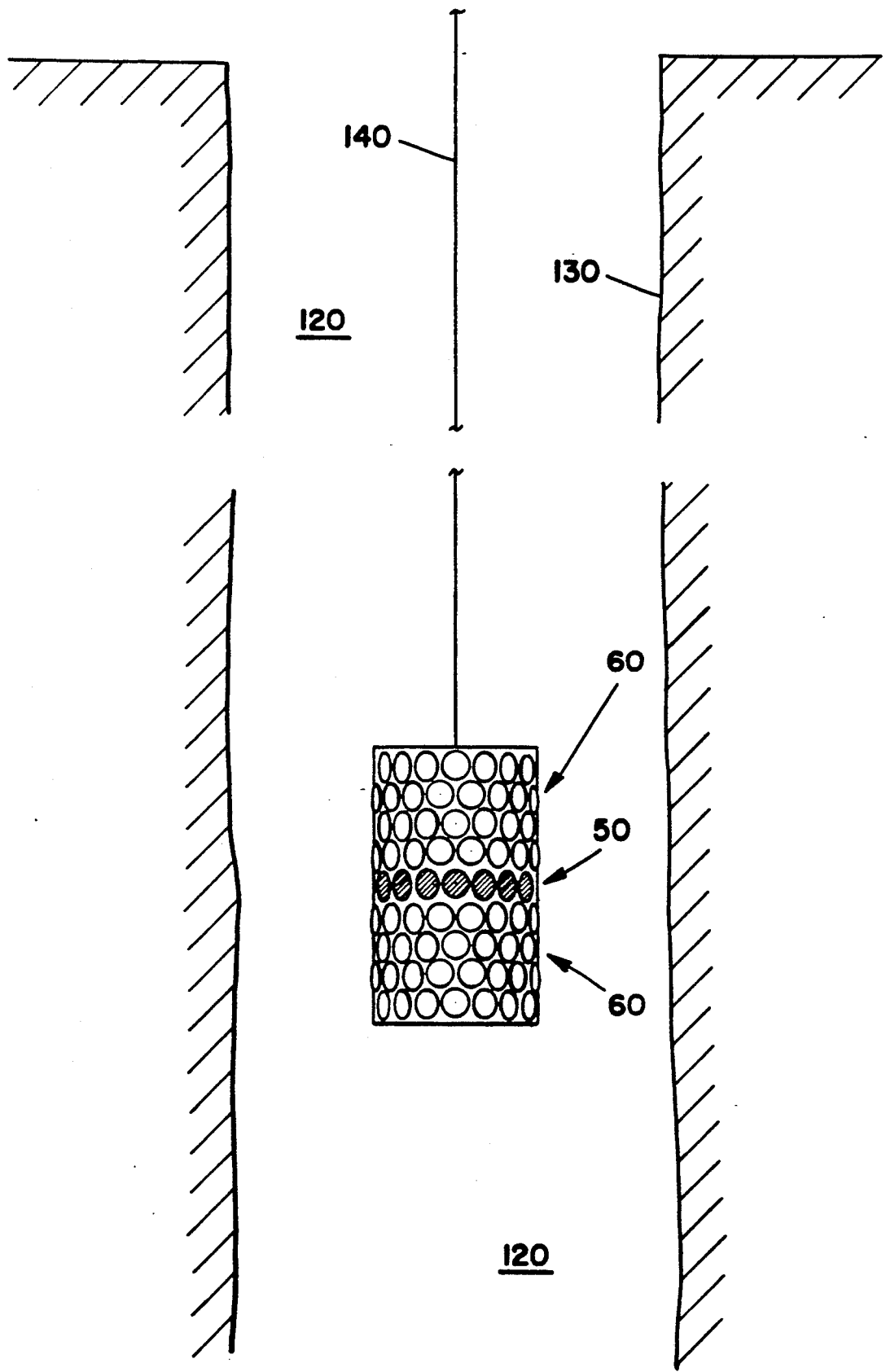
FIG_10

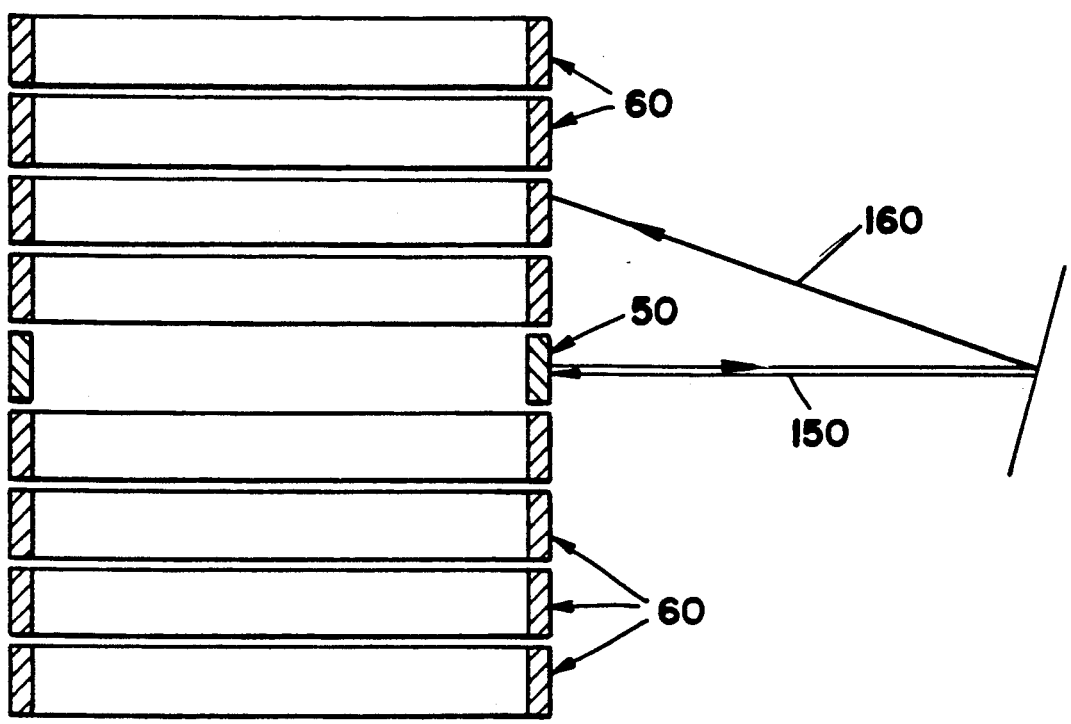
FIG_11a
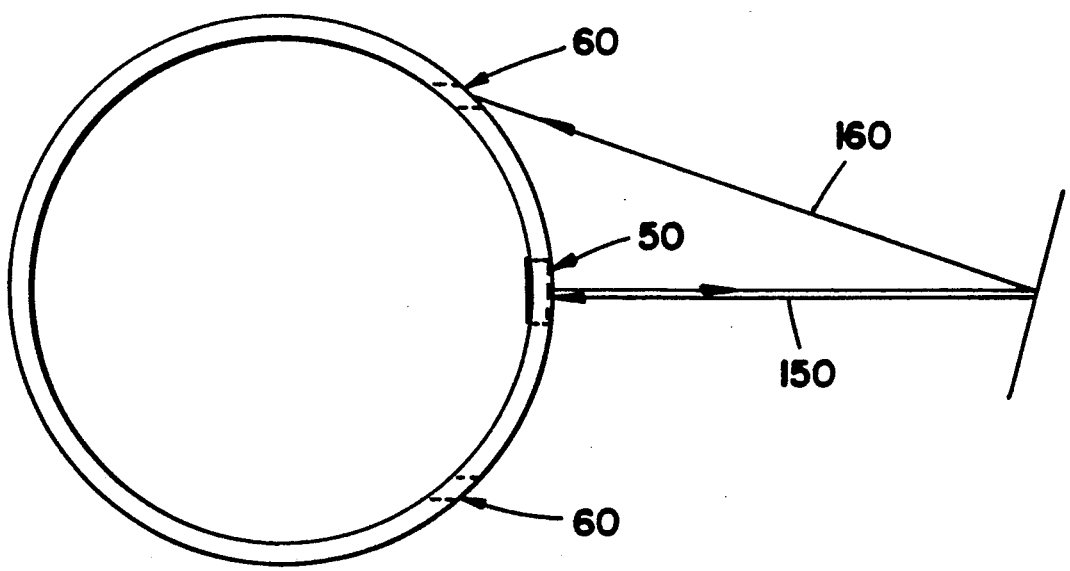
FIG_11b

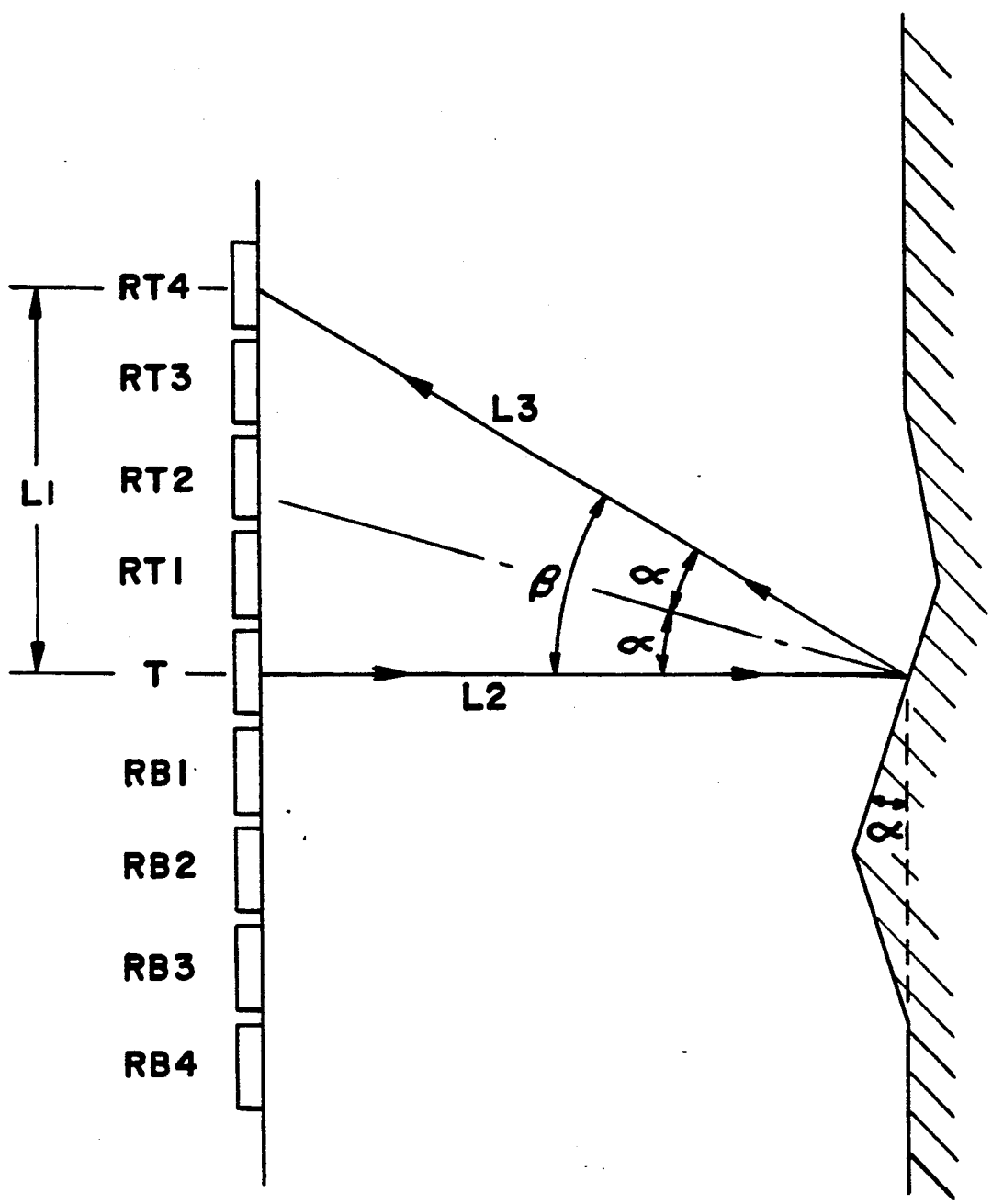
FIG_12

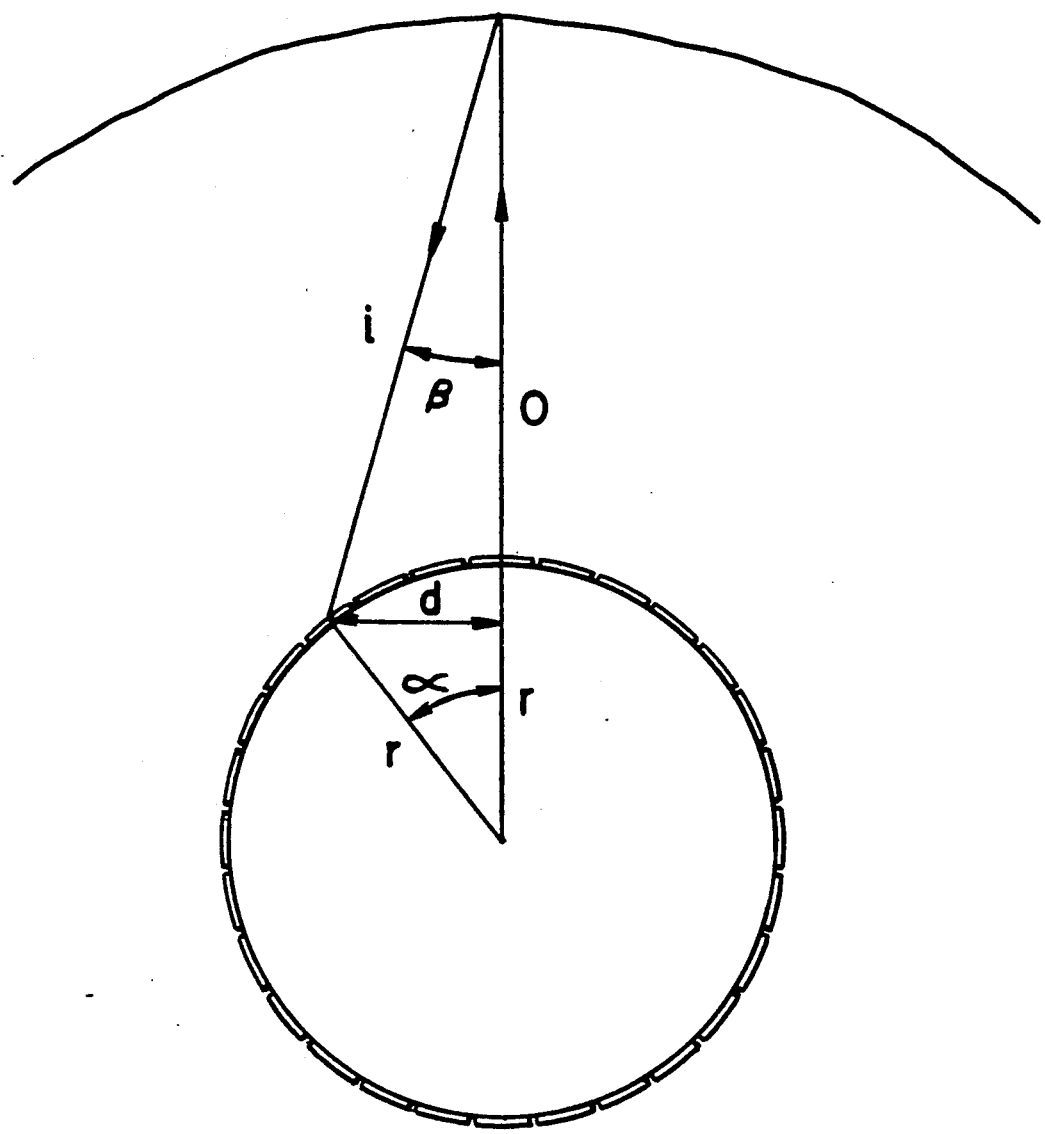
FIG_13

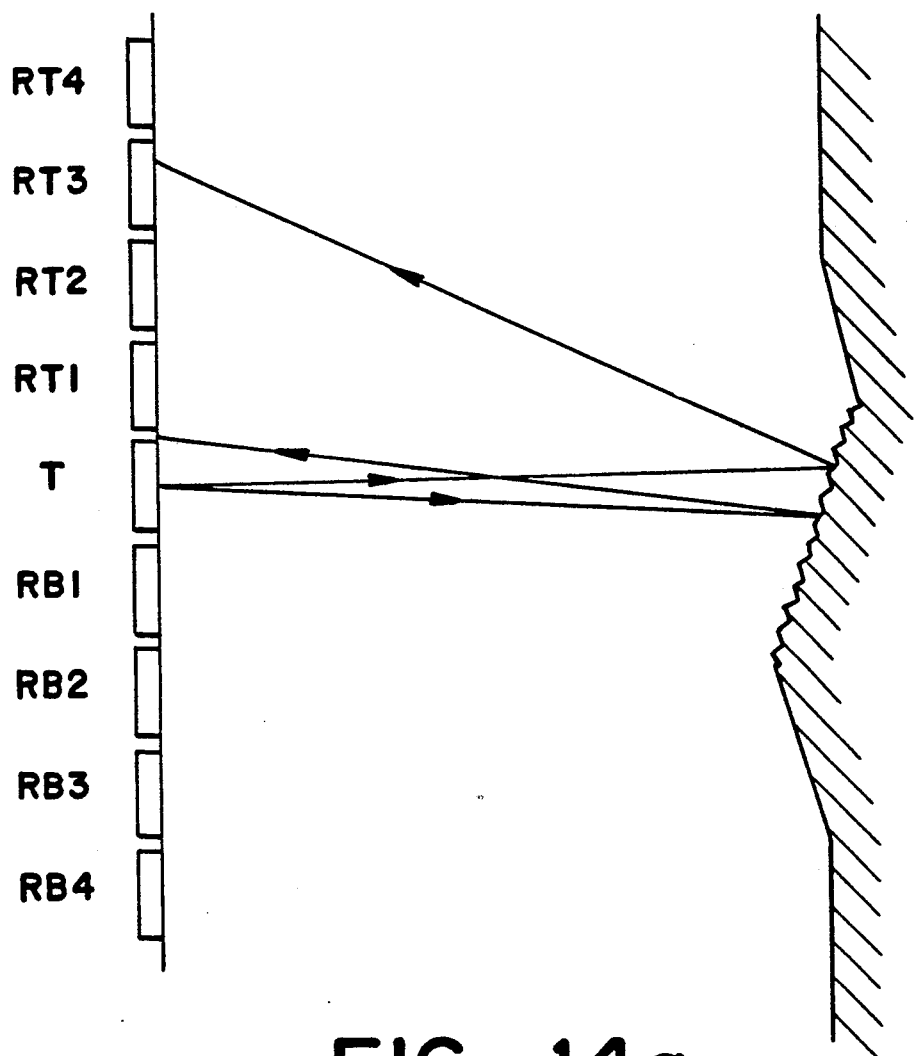
FIG_14a
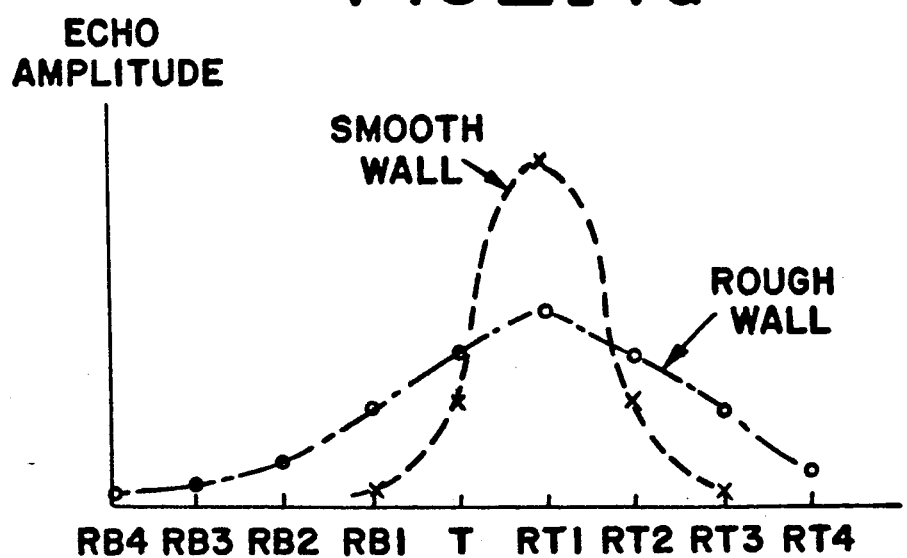
FIG_14b

METHOD AND APPARATUS FOR ULTRASONIC SCANNING OF A BOREHOLE HAVING IMPROVED SENSOR ARRAY AND TIMING CIRCUIT

This is a continuation-in-part of application Ser. No. 153,629, filed Feb. 8, 1988, entitled "IMPROVED SIGNAL DETECTION FOR BOREHOLE TELEVIEWER" now abandoned..

BACKGROUND OF THE INVENTION

The borehole televiewer is a tool which provides a detailed sensing of the reflectance and topographic properties of a borehole surface, thereby giving a circumferential "picture" of the borehole wall. This imaging is accomplished through the use of a transmitter and receiver notably mounted in a logging tool, or alternatively a single transducer capable of both functions. The transducer or transmitter/receiver combination is continuously rotated within the wellbore, wherein the transmitter/transducer produces a series of pulses of acoustic energy. These pulses travel to the periphery of the borehole, where they impinge upon the borehole wall, and return as an echo signal to the receiver/transducer. This received echo pulse is then applied to an amplifier, the output of which is used to modulate a display of the intensity of the received signal. In addition to conducting the reflected energy signals to the display device, means for determining the tools orientation within the wellbore is provided which utilizes an orientation pulse related to a geographic direction. One such borehole televiewer is described in U.S. Pat. No. 3,369,626, which is incorporated by reference herein for all purposes.

As the transmitted pulse from the transmitter/transducer impinges upon the surface of the borehole wall, some energy is specularly reflected according to the laws of geometric optics, and some energy is scattered in all directions due to the rugosity of the borehole well surface. The amount of such scattered energy as compared to that specularly reflected is controlled by said rugosity on a scale comparable to or smaller than the wavelength of the incident ultrasonic energy.

The extreme sensitivity of the amplitude measurement of the reflected signal, to the angle of incidence at which the signal is reflected, severely restricts the area over which any data from a conventional borehole televiewer is obtained due to the limitations of the typical borehole televiewer design. Typical designs utilize a single transmitter/transducer which produces an ultrasonic beam having an angle of about 3°, with rapidly decreasing power levels to about 6°. If the angle of incidence of the reflected signal to the borehole wall is not perpendicular, the angularly reflected signal will not be picked up by the receiver/transducer, being scattered instead within the wellbore. Attempts to measure these scattered signals have been suggested wherein means are provided for measuring the extent of variation or decay in the reflection signal from a maximum value for each position of the rotating transducer. This variation corresponds to the amplitude variation away from a perpendicular specular reflection path. A numerical value may then be assigned to define the sharpness or flatness of the curve defining such variation. However, such a method merely relates these non-specular signals to a measured specular signal, giving no unique information on the signal itself.

It is therefore an object of the present invention to provide an apparatus and method for making ultrasonic measurements of the energy scattering properties of the surface of a borehole surface in order to characterize its rugosity.

It is more particularly an object of the present invention to provide an improved means for providing an improved signal-to-noise ratio of reflected echo signals by measuring said signals individually as directly reflected signals.

SUMMARY OF THE INVENTION

The present provides an apparatus and method that improves the si -to-noise ratio of reflected energy signals produce a borehole televiewer. By utilizing a transmitting transducer in conjunction with an array of receivers, ea its own signal conditioning and detection both above and below the transmitting transducer, the present device to directly measure the unique si characteristics of both vertically and horizontally re echo signals. Traces associated with individual measured for each separate excitation of the transducer, wherein the excitations are governed by a timing means to prevent secondary signal detection, thereby providing an improved, relatively high resolution image of the borehole wall surface.

In one embodiment of the present invention, the receivers, both above and below a single transmitting transducer, are arranged in a co-planar array extending 45° on either side of the transducer. This arrangement has no redundant receivers facing in a direction where directly reflected signals are not expected.

In another embodiment, a stationary receiver array extends around the entire circumference of the tool, forming a segmented ring. Only those receivers which are mounted on either side of the single transducer, and in the same horizontal plane are rotated, while those receivers superior and subjacent to said horizontal plane remain stationary.

In still another embodiment, one most preferred, the horizontal plane of the previously described embodiment comprises a segmented, stationary ring of transducers, each capable of both transmitting and receiving signals. Each of the transducers is linked to a timing-sequencing circuit which triggers the sequential firing of diametrically opposed transducers. Once the firing cycle is completed, a gate within the echo capturing circuitry is used to disable the transmission circuitry, and sample the noise level present in the borehole after the arrival of the reflected echo signal. The sampled noise is then used to estimate a minimal delay period between subsequent firing cycles while ensuring that a minimal amount of noise from prior transmissions will be present when the next firing cycle is commenced.

BRIEF DESCRIPTION OF THE DRAWINGS

In order to facilitate the understanding of this invention, reference will now be made to the appended drawings of the various embodiments of the present invention. The drawings are exemplary only, and should not be construed as limiting the invention.

FIG. 1a is a side view of the first embodiment, showing an array of receivers extending about 45° along the periphery of the tool.

FIG. 1b is a top view of FIG. 1a.

FIG. 2 is a block diagram of the signal conditioning and echo capative circuits of the first two embodiments.

FIG. 3 is a diagram second embodiment having stationary receivers above and below a rotating transducer/receiver array.

FIG. 4 is a diagram of the preferred embodiment, having the same stationary receivers as FIG. 3, as well as a stationary horizontal array of transducers.

FIG. 5 is a block diagram of the controller-processor used to determine the sequential firing pattern of the transducers.

FIG. 6 is a block diagram of the pulse generator and sequencer illustrated in FIG. 5.

FIG. 7 is a block diagram of the signal conditioning and echo capture circuits of the preferred embodiment, illustrating the use of a delay gate in conjunction with the peak signal detector.

FIG. 8 is a top view representation of a 32 transducer tool, wherein the numbers indicate a given transducer number.

FIG. 9 is a graphical representation of a firing sequence and signal detection by the preferred embodiment.

FIG. 10 illustrates the present invention in its operational environment.

FIG. 11a illustrates a side view of the type of specular and non-specular reflections received by the present invention.

FIG. 11b illustrates a top view of the type of specular and non-specular reflections received by the present invention.

FIG. 12 illustrates the vertical deflection angle $\alpha$ for a reflected signal.

FIG. 13 illustrates a horizontal deflection angle $\beta$ for a reflected signal FIG. 14a illustrates how reflected signals can be used to determine rugosity of the wellbore sidewall.

FIG. 14b is a graphical representation based on FIG. 14a, of both smooth and rough sidewall surfaces.

DETAILED DESCRIPTION OF THE INVENTION

In its broadest aspect, the present invention provides a method and apparatus that improves the signal-to-noise ratio of reflected echo signals produced by an acoustic transducer in a borehole televiewer. The apparatus utilizes an array of acoustic receivers in close enough proximity to the transducer to receive the echo signals as directly reflected signals. The term "directly reflected" or "primary" signals is meant to indicate signals that have been reflected from the borehole wall only once, not the secondary signals resulting from further reflection by the borehole wall or the televiewer, and not those signals which traverse the borehole surface prior to reception.

In one embodiment of the present invention, as depicted in FIG. 1a, the array of receivers 10 is arranged around the periphery of the tool in a co-planar fashion above, below, and adjacent to a single transducer 20 to directly detect non-specularly reflected echo signals transmitted from the transducer. The e receivers are mounted on the same rotating shaft or cylinder 30 as the transducer, thereby allowing the receivers to always face in the direction of the returning echo signal. Each of the individual receivers is connected to a signal processing channel, consisting of both signal conditioning and echo capture circuits, followed by an analog/digital converter, as shown in FIG. 2. This converter may in turn be connected to several unique channels corresponding to other receivers in the array via a multiplexer. In the preferred embodiment the receivers are situated so that the longitudinal axis of the receivers are substantially parallel to the longitudinal axis of the logging tool; and arranged so that viewed from a horizontal cross-section perspective as depicted in FIG. 1b, the sector covered by the receiver is approximately 45° on either side of the transducer in a uniform spacing configuration. In this way, a horizontally deflected signal, having an angle of incidence just less than an angle tangent to the periphery of the tool, will be received as a directly reflected signal. Those signals having an incidence angle greater than said tangent angle will be reflected once again off the borehole sidewall, resulting in secondary signal noise within the borehole. The rotating cylinder 30 containing the receiver array can be optionally mounted within a pressure compensated cavity located inside the logging tool itself, or fully exposed to the borehole fluids and conditions.

In an alternative embodiment, as depicted in FIG. 3, receivers 10 are placed circumferentially on the stationary body of the tool in a uniform spacing configuration. A central rotating unit 40 houses a single transducer 20, adjacent to which on either side are a plurality of receivers 10a affixed to the same horizontal plane as the transducer. In this alternative embodiment the rotating unit scans the circumference of the borehole as the transducer, through timing circuitry generally known in the art, sequentially transmits an acoustic signal with a repetition frequency based on a fixed value determined by the velocity of sound in the borehole fluid, the borehole diameter, and the attenuation of the signal. Those returning echo signals which are horizontally deflected are received by receivers on the rotating unit, while vertical deflections are Picked up by stationary receivers affixed to the tool. Just as in the previous embodiment, each receiver, as well as the transducer, is connected to a single processing channel having both signal conditioning and echo capture circuits.

In the most preferred embodiment, as depicted in FIG. 4, the tool has no rotating unit as described in the previous embodiment. Instead, a stationary ring of transducers 50, in a central horizontal array configuration, is affixed to the periphery of the tool; with each transducer having both transmitting and receiving capabilities. Arranged above and below this central ring are a series of receivers, in the segmented ring formation 60 found in the previous embodiment. Because the central ring is stationary, circumferential scanning of the borehole interior is accomplished by an electronic sequencing circuit, comprising a controller-processor combination, as shown in FIG. 5, which controls the firing sequence of the transducers in the central ring 70 and the reading of the time/amplitude values of the received echo signals. Like the receivers in the previous embodiments, each transducer is connected to its own signal conditioning, peak detection and conversion circuits which produce time/amplitude values for a detected echo signal. These values are read by the main controller, with parameters in each channel being set through the control and data/address bases 80. The pulse generator-sequencer combination 90 is further detailed in FIG. 6, and can fire any of the transducers 20 in any combination or sequence as selected by the main controller, thereby allowing greater operational flexibility. In the preferred mode, sequencing of the transmission pulse is based on the fact that there is negligible interference between the four 90° quadrants of the tool. A firing cycle utilizing diametrically opposed transducers within the central array, each within approximately 90° of each other, is therefore used to optimize primary signal reception and tool operational speeds. The time interval between the firing of each transducer can be as short as the individual circuit and its components allows, and will dictate the speed at which the tool is moved through the borehole. After each firing sequence, a delay follows prior to pulsing the next four transducers in the next firing sequence, thereby ensuring no residual noise from prior transmission pulses will be picked up during a given firing sequence. There are two modes by which the delay or the transmission cycle time may be set; either through a fixed clock value as in the previous embodiment and well known in the art, or based on a specific event. In this latter mode which may be used in the previously described embodiments, but which is preferred for the present embodiment, subsequent firing sequences are made dependent on the time the reflected echo signal is received; this time value is then used to estimate the delay time based on the amount of noise present. To reduce the probability of noise spikes triggering the peak detector component within the signal capturing circuits of the receivers/transducers, a gate 100, having a high noise margin and associated with a particular receiver/transducer, as depicted in FIG. 7 is used to disable the detector during the time interval in which no echo reflection is expected. A second gate 110 will sample the noise level present in the borehole interior after the arrival of the primary echo signal, thereby allowing for an estimation of a minimum delay period prior to triggering the next firing sequence. The sequencing operation of this preferred embodiment is best described by reference to FIGS. 8 and 9. Transducer 1 ($T_1$) is fired first activating gate $G_1$, followed immediately by $T_{17}$ and $G_{17}$, which is offset 180°; followed immediately thereafter by $T_9$ and $T_{25}$ and their associated gates. The time interval, ts, between these firings, as previously discussed can be as short as the circuit and operating parameters require. The delay in the firing cycle to follows before the next four transducers are pulsed. As an example, for the 32 transducer embodiment of FIG. 8, the transducer firing sequence would be as follows:

| TRANSDUCER NUMBER | | OFFSET (DEGREES) |
|---|---|---|
| 1 | | 0 |
| 17 | | 180 |
| 9 | | 90 |
| 25 | | 27 |
| | DELAY | |
| 5 | | 45 |
| 21 | | 225 |
| 13 | | 135 |
| | | 315 |
| | DELAY | |
| 2 | | 0 + x |
| 18 | | 180 + x |
| 10 | | 90 + x |
| 26 | | 270 + x |
| | DELAY | |
| *6 | | 45 + x |
| | DELAY | |
| *3 | | 0 + 2x |
| | DELAY | |
| *7 | | 45 + 2x |
| | DELAY | |

Where x=360/32 and * indicates transducer number diametrically opposed to the identified number, as well as those transducers lying at the same offset angle in relation to a symmetrically reflected axis. This even based transmission cycle-delay combination, herein described, allows for great operational flexibility based on the need for either high signal resolution or tool operation speed. The controller/processor can be programmed for a very rapid firing sequence, making each transmission cycle approximate a simultaneous firing of the diametrically opposed transducers without the complex circuitry a simultaneous firing system would require. Alternatively, the timing between the sequential firing can be lengthened, thereby allowing reception of the individual transmission signals minimizing the degree of secondary background interference which may exist with faster firing rates, resulting in a higher resolution image.

In operation all the embodiments herein described function similarly with regard to signal transmission reception and processing; with differences between individual embodiments lying in receiver configuration, method of scanning, and signal sequencing for an improved signal-to-noise ratio. Therefore, the foregoing description applies equally to all above-described embodiments.

Referring to FIG. 10, a downhole survey tool 120 is positioned in borehole 130 and is connected to the surface by logging cable 140. This tool is provided with a transducer arrangement, as previously described in the varying embodiments of the invention, which scans the complete circumference of the borehole by transmitting an acoustic pulse or series of pulses. The signal will impinge on the sidewall of the borehole and be reflected back, the reflected signal having both specular and non-specular components. As shown in FIG. 11, the initial or primary specular component 150 will be received by the transmitting transducer, wherein the signal conditioning, peak detection, and conversion circuit for the receiver outputs time and amplitude values. The non-specular signal components 160, deflected both vertically and horizontally, are similarly captured by either non-transmitting transducers or receivers surrounding the transmitting transducer. With each transducer and receiver having its own signal conditioning circuits, precis signal amplitude measurements at each receiver is possible, allowing for accurate calculations of sidewall geometry based upon this amplitude, receiver location and signal transit time.

Subsequent specular reflections from the transducer to the sidewall and back to the transducer will occur over a given period, resulting in strong secondary signals known as ringing, which are of prime concern. The first two embodiments utilize a noise gate $6_f$ as shown in FIGS. 7 and 9, to prevent the peak detector from triggering the firing of the transducer due to ringing within the wellbore, or due to secondary signal reception from any one of the receiver arrays. This is exemplified in FIG. 9 wherein $G_f$ prevents the premature triggering of the peak detector due to secondary ringing 170, so that receiver $R_1$ may capture the true echo signal 180. In the sequential firing pattern of the preferred embodiment, a second date Gx, is utilized in combination with noise gate $G_f$ to find the minimum delay after the firing of the last transducer of a given sequence to optimize both the sequential firing rate and the signal-to-noise ratio. This is exemplified in FIG. 9, where after $R_1$ receives the primary signal, gate Gx activates after time tn to sample residual noise within the wellbore to establish the delay period td. After period td the transducers of the next firing sequence are triggered and the above-described events repeated until the entire circumference is scanned.

The signals received by each receiver, as the tool traverses the wellbore, are analyzed in three ways, utilizing the measured amplitude, known receiver location relative to the transmitting transducer, and signal transit time. One way in which the received signals are analyzed is the determination of the signal's angle of reflection. This angle is defined as the deviation of the borehole sidewall at a given point from the borehole axis as exemplified in FIG. 12 where $\alpha$ denotes the angle of reflection. The angle $\alpha$ is determined for each receiver by measuring the transit time t and the distance $L_1$. Referring to FIG. 4, an equation for determining angle $\beta$ for vertically reflected signals can be derived using a calibration constant k to relate to transmit time t to the total distance traveled by the ultrasonic beam.

$$L2 + L3 = k * t \quad L3 = k * t - L2$$
$$\tan \beta = L1/L2$$
$$L3 = L1^2 + L2^2$$

$$\tan \beta = \frac{2 * k * t * L1}{(k * t)^2 - L1^2}$$

$$\alpha = 0.5 * \tan^{-1}\left(\frac{2 * k * t * L1}{(k * t)^2 - L1^2}\right)$$

For horizontally reflected signals the relationship between the transmitted and received signal, as shown in FIG. 13, is used to determine the reflection angle as follows:

where $u = i + o$ and $x = o + r$

Therefore, by the law of cosines $i^2 = r^2 + x^2 - 2rx \cos \alpha$ $(u-o)^2 = r^2 + x^2 - 2rx \cos \alpha$ $u^2 = 2r^2 + 2r^2 \cos \alpha = 2uo + 2ro \cos \alpha$ $o = u^2 - 2r^2 + 2r^2 \cos \alpha 2u + 2r - 2r \cos \alpha$ where for $\alpha = o$:

$$o = u^2 - \frac{2r^2}{2u} + 2r^2 = \frac{U}{2}$$

Therefore:

$d = r \sin \alpha = i \sin \beta$

Giving $$\beta = \sin^{-1}\left(\frac{r \sin \alpha}{i}\right)$$

Another way received signals are analyzed is in determining the rugosity of the borehole wall. This measure of surface roughness is determined by deriving a qualitative indication of the surface texture from the ratio of signal amplitudes at the receiver with the maximum signal and the signals received from surrounding receivers. For example, referring to FIG. 14a if the largest amplitude A is found at receiver $RT_3$, the rugosity indicator, RI, may be obtained as follows:

$$RI = \frac{ART_4 + ART_2}{ART_3}$$

Referring to FIG. 14b, the comparative rugosity of both a smooth wall and a rough wall are displayed for a maximum signal amplitude received by receiver $RT_1$.

While the present invention has been described with reference to specific embodiments, this application is intended to cover those various changes and substitutions which may be made by those skilled in the art without departing from the spirit and scope of the appended claims.

What is claimed is:

1. An apparatus for providing a high resolution image of the walled surface of a borehole structure comprising:
a tool designed to be lowered into the borehole structure, said tool having an outer housing including an acoustic signal transmitting means and a plurality of acoustic signal receiving means affixed to said housing in a geometric configuration relative to said signal transmitting means such that a nonspecular component of a reflected signal having an angle of incidence less than an angle tangent to a peripheral edge of said tool is received as a primary signal, said transmitting and receiving means further comprising an event based timing means capable of sensing downhole noise level and triggering subsequent transmission based upon said noise level, an individual signal conditioning and detecting means for each of said receiving means, and a scanning means for sequentially transmitting an acoustic signal in a pattern yielding an enhanced signal-to-noise ratio for a given primary signal.

2. An apparatus as set forth in claim 1 wherein the signal transmitting means is a transducer and the signal receiving means is an acoustic receiver.

3. An apparatus as set forth in claim 2 wherein the geometric configuration of the acoustic receivers relative to the transducer is a coplanar array above and below said transducer spanning horizontally to about 45° on each side of the transducer relative to said tools vertical axis.

4. An apparatus as set forth in claim 2 wherein the geometric configuration of the acoustic receivers relative to the transducer is a series of horizontal arrays circumferentially positioned and vertically stacked above and below said transducer, said geometric configuration further comprising a rotating horizontal array of receivers symmetrically arranged relative to a centrally loaded transducer.

5. An apparatus as set forth in claim 4 wherein the receivers of the rotating horizontal array cover a 90° quadrant relative to a vertical axis of the tool.

6. An apparatus as set forth in claim 2 wherein the geometric configuration of the acoustic receivers is a series of segmented rings vertically stacked above and below a centrally located segmented ring of transducers.

7. An apparatus as set forth in claim 6 wherein the scanning means further comprises a transmission pulse sequencing means capable of sequentially selecting a plurality of diametrically opposed operating quadrants within the borehole structure.

8. An apparatus for improving the signal-to-noise ratio of a well logging system comprising:
- a tool designed to be lowered into a borehole cavity, said tool having a substantially continuous horizontal array of acoustic transducers concentrically mounted around a vertical axis of said tool,
- a substantially continuous co-planar array of receivers above and below said horizontal transducer array, said receiver array concentrically mounted around a vertical axis of said tool to receive primary acoustic reflections having both a specular and nonspecular component, said nonspecular component having an angle of incidence less than an angle tangent to a peripheral edge of said tool,
- a signal conditioning and detection means operably connected to each receiver and transducer within said receiver and transducer arrays,
- an event based timing means further comprising a delay means for suppressing activation of said transducers based on transient acoustic energy within said wellbore, and
- a scanning means for selectively activating the transducers in a pattern of diametrically opposed activation.

9. A well logging method for providing a high resolution image of a sidewall of a borehole cavity comprising:

(a) sequentially generating an acoustical transmission pattern of non-interfering pulsed beams of acoustic energy, said pattern further comprising subsequent transmission of acoustic energy from an acoustic source diametrically opposed to a prior source of acoustic energy transmission, (b) measuring an amplitude and transit time for the acoustic energy attributable to direct acoustic reflections by individual receiver units in a co-planar array, a portion of said acoustic energy comprising both vertical and horizontal reflections such that a nonspecular component of said reflections having an angle of incidence less than an angle tangent to a peripheral edge of a logging tool generating said acoustic transmissions, (c) disabling the means for generating acoustic energy and sampling the level of transient acoustic energy within the borehole cavity, said sampling level controlling the reactivation of the means for generating acoustic energy, said reactivation triggered when a noise level in the borehole is below a threshold noise level to provide an enhanced signal-to-noise ratio for subsequently received acoustic reflections, and (d) selecting a new series of transmission zones to repeat steps (a) to (c), said selection of zones to continue until the entire circumference of the wellbore cavity is scanned.

* * * * *